United States Patent
Van Den Berg et al.

(10) Patent No.: US 9,751,994 B2
(45) Date of Patent: Sep. 5, 2017

(54) METHOD FOR CURING A RADICALLY CURABLE RESIN

(71) Applicant: Akzo Nobel Chemicals International B.V., Arnhem (NL)

(72) Inventors: Michel Van Den Berg, Deventer (NL); Auke Gerardus Talma, Bathmen (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/100,511

(22) PCT Filed: Dec. 9, 2014

(86) PCT No.: PCT/EP2014/076949
§ 371 (c)(1),
(2) Date: May 31, 2016

(87) PCT Pub. No.: WO2015/086546
PCT Pub. Date: Jun. 18, 2015

(65) Prior Publication Data
US 2016/0297936 A1    Oct. 13, 2016

(30) Foreign Application Priority Data
Dec. 12, 2013 (EP) .................... 13196803

(51) Int. Cl.
| | |
|---|---|
| C08J 3/24 | (2006.01) |
| C08J 3/02 | (2006.01) |
| C08J 3/09 | (2006.01) |
| C08K 5/00 | (2006.01) |
| C08K 5/06 | (2006.01) |
| C08K 5/14 | (2006.01) |
| C08K 5/521 | (2006.01) |

(52) U.S. Cl.
CPC .  *C08J 3/24* (2013.01); *C08J 3/02* (2013.01); *C08J 3/095* (2013.01); *C08K 5/0091* (2013.01); *C08K 5/06* (2013.01); *C08K 5/14* (2013.01); *C08K 5/521* (2013.01); *C08J 2331/04* (2013.01); *C08J 2333/10* (2013.01); *C08J 2367/06* (2013.01)

(58) Field of Classification Search
CPC .............................. C08F 8/42; C08F 2810/20
See application file for complete search history.

(56) References Cited

U.S. PATENT DOCUMENTS

| | | | | |
|---|---|---|---|---|
| 3,282,909 A | * | 11/1966 | Manuel | ................... C08C 19/26 252/62.51 R |
| 5,212,210 A | * | 5/1993 | Halm | ................... C08G 18/161 427/517 |
| 6,063,637 A | | 5/2000 | Arnold et al. | |

FOREIGN PATENT DOCUMENTS

| | | |
|---|---|---|
| EP | 2014729 A1 | 1/2009 |
| GB | 1123048 | 8/1968 |
| WO | 2008/003492 A1 | 1/2008 |
| WO | 2008/003493 A1 | 1/2008 |
| WO | 2008/003500 A1 | 1/2008 |
| WO | 2011/157673 A1 | 12/2011 |
| WO | 2012/000934 A1 | 1/2012 |

OTHER PUBLICATIONS

Auke G. Talma, et al, Synthesis of 4'-Vinylbenzo-3n-Crown-N Ethers, Synthesis, Received Aug. 21, 1985, pp. 680-683.
Search Report of EP13196803.4, dated Mar. 14, 2013.
International Search Report and Written Opinion of PCT/EP2014/076949, mailed Mar. 10, 2015.

* cited by examiner

*Primary Examiner* — Robert C Boyle
(74) *Attorney, Agent, or Firm* — McDonnell Boehnen Hulbert & Berghoff LLP

(57) ABSTRACT

Method for curing a radically curable resin by adding to said resin an organic peroxide and a metal-bearing polymer, said metal-bearing polymer comprising functional groups that coordinate to a metal selected from the group consisting of Cu, Mn, Fe, and V and form a complex together with said metal and a complexing agent.

11 Claims, No Drawings

METHOD FOR CURING A RADICALLY CURABLE RESIN

This application is a national stage filing under 35 U.S.C. §371 of PCT/EP2014/076949, filed Dec. 9, 2014, which claims priority from European Patent Application No. 13196803.4, filed Dec. 12, 20139, the contents of which are each incorporated herein by reference in their entireties.

The present invention relates to a method for accelerating the cure of radically curable resins with an organic peroxide via a redox system.

Conventional redox systems comprise an oxidizing agent (e.g. a peroxide) and a soluble transition metal ion as accelerator. The accelerator serves to increase the activity of the oxidizing agent at lower temperatures and, consequently, to speed up the cure.

Accelerator systems can be added to the resin to be cured in different ways. One method involves the addition of the individual accelerator ingredients to the resin, before the peroxide is added. This can be done just in advance of peroxide addition or days or weeks before that. In the latter case, we refer to a pre-accelerated resin composition, which comprises the resin and the accelerator ingredients and can be stored until further use and cure with the peroxide. Another method involves the pre-preparation of an accelerator solution containing the accelerator ingredients, which solution can be stored until further use and addition to the resin. A pre-accelerated resin can be prepared by either adding the individual ingredients of the accelerator system to the resin or by adding these ingredients in admixture in the form of an accelerator solution.

Typical accelerator systems comprise a transition metal salt or complex. The most frequently used transition metal for this purpose is cobalt. However, legislation requires reduction of the amount of cobalt in view its toxicity.

As a result, there is a desire for the provision of Co-free accelerators. Examples of documents disclosing such Co-free accelerator systems are WO 2008/003492, WO 2008/003793, and WO 2008/003500. The metals used in the accelerator systems according to these documents—instead of Co—are Mn, Cu, Fe, and Ti. The disclosed accelerator systems are present in an unsaturated polyester or vinyl ester resin in the form of a pre-accelerated resin. This pre-accelerated resin is said to contain less than 0.01 mmol Co per kg resin.

Metal compounds disclosed in these applications are metal carboxylates, acetoacetates, and chlorides. Although less harmful than many cobalt salts and complexes, toxicity and environmental concerns also exist for many of these metal compounds. Therefore, there is a desire for accelerator systems with even less health and/or environmental concerns.

The present invention provides such a system. The present invention relates to a method for curing a radically curable resin by adding to said resin an organic peroxide and a metal-bearing polymer, said metal-bearing polymer comprising functional groups that coordinate to a metal selected from the group consisting of Cu, Mn, Fe, and V and form a complex together with said metal and a complexing agent.

The terms "coordinate" and "complex" in this specification relate to any form of interaction between metals and organic compounds, either in the form of an ionic bond or a metal-ligand interaction.

The present invention also relates to an accelerator solution suitable for forming a redox couple with a peroxide and comprising the metal-bearing polymer and a solvent.

The invention also relates to a two-component composition comprising a resin pre-accelerated with the metal-bearing polymer and an organic peroxide.

It should be noted that a Mn-bearing polymer has been disclosed in WO 2012/000934. This polymer is used as siccative in alkyd-based paints and inks. However, this curing of alkyd resins involves an air drying process; not a free-radical process using peroxides like the method of the present invention.

The metal-bearing polymer can be any type of polymer, including homopolymers, random copolymers, and block copolymers. Examples of suitable polymers are polystyrene, styrene-maleic anhydride copolymers, polyacrylates or polymethacrylates, saturated or unsaturated polyesters, polyamides, and polyimides. Polyesters are the most preferred. Even more preferred are unsaturated polyesters.

The polymer is preferably of polar nature. This in contrast to, for instance, alkyd resins, which are very apolar due to their fatty acid chains.

The weight average molecular weight of the polymer is preferably in the range 500-50,000 g/mol, more preferably 1,000-20,000 g/mol, and most preferably 5,000-10,000 g/mol. This molecular weight is determined with High Performance Size Exclusion Chromatography (HP-SEC) using polystyrene standards.

Examples of functional groups to be present on the polymer are amines, carboxylates, phosphonates, phosphonic acid, phosphines, 1,3-diketones, imines with the structure R—C(=O)—CH$_2$—C(=NR)—R, and ligands such as bispidon ligands (such as dimethyl-2,4-di-(2-pyridyl)-3-methyl-7-(pyridin-2-ylmethyl)-3,7-diaza-bicyclo[3.3.1]nonan-9-one-1,5-dicarboxylate trimethyl-1,4,7-triazacyclononane), crown ethers, aza-crown ethers, benzo-crown ethers, porphirines, and ionophores. Most preferred are amines, carboxylates, 1,3-diketones, and bispidon ligands. These functional groups can be introduced onto the polymer by co-polymerizing a monomer with the desired functional groups during the preparation of the polymer, for instance in the manner described in A. G. Talma et al, *Synthesis* 1986, 680-683.

Ligand-functionalised momomers can be prepared by first functionalizing said ligand with a group that is reactive with a suitable monomer (e.g. hydroxy- and amine groups), followed by reacting said functionalized ligand with the monomer. It is also possible to introduce the ligand or functional group on an existing polymer, for instance via addition chemistry or condensation reactions (e.g. amidation or esterification).

The metal can be added to the functionalized polymer, or can already be present during the preparation of said functionalized polymer.

The metal content of the metal-bearing polymer is preferably in the range 0.01-15 wt %, more preferably 0.1-10 wt %, and most preferably 1-5 wt %, based on the weight of the metal-bearing polymer. This metal content can easily be determined by ICP.

The metal is selected from the group consisting of Cu, Mn, Fe, and V. The preferred metals are Cu, Fe, and V.

The metal is complexed, both by the functional group on the polymer and by the complexing agent. This complexing agent can be selected from carboxylate-bearing compounds, 1,3-diketones, halogen atoms, amines, phosphonates, phosphonic acid, phosphines, imines with the structure R—C(=O)—CH$_2$—C(=NR)—R, and ligands such as crown ethers, aza-crown ethers, benzo-crown ethers, porphirines, and ionophores.

Examples of suitable carboxylate-bearing compounds are 2-ethyl hexanoates, octanoates, nonanoates, heptanoates, neodecanoates, naphthenates, and the carboxylate-bearing polymers as described above.

Examples of 1,3-diketones are acetyl acetone, benzoyl acetone, and dibenzoyl methane, and acetoacetates such as diethyl acetoacetamide, dimethyl aceto-acetamide, dipropylacetoacetamide, dibutylacetoacetamide, methyl acetoacetate, ethyl acetoacetate, propyl acetoacetate, and butylacetoacetate.

The preferred halogen atom is Cl.

The metal-bearing polymer can be used to accelerate the free-radical cure of unsaturated resins. The metal-bearing polymer can be added to the resin as such or in the form of a so-called accelerator solution containing, in addition to the metal-bearing polymer, a solvent and optionally other compounds.

The metal-bearing polymer can be added to the resin (as such or as an accelerator solution) just in advance of peroxide addition or days or weeks before that. In the latter case, we refer to a pre-accelerated resin.

Examples of suitable solvents are phorphorous compounds and hydroxy-functional solvents. Preferably, the accelerator solution contains at least one solvent selected from compounds with the formulae $P(R)_3$, $P(R)_3=O$, and $HO-(-CH_2-C(R^1)_2-(CH_2)_m-O-)_n-R^2$, wherein each R is independently selected from hydrogen, alkyl with 1 to 10 carbon atoms, and alkoxy groups with 1 to 10 carbon atoms, each $R^1$ is independently selected from the group consisting of hydrogen, alkyl groups with 1-10 carbon atoms, and hydroxyalkyl groups with 1 to 10 carbon atoms, n=1-10, m=0 or 1, and $R^2$ is hydrogen or an alkyl group with 1-10 carbon atoms.

Preferably, in the phosphorous compounds with the formulae $P(R)_3$ and $P(R)_3=O$, at least two R-groups are selected from either alkyl groups or alkoxy groups. Specific examples of suitable phosphorous-containing compounds are diethyl phosphate, dibutyl phosphate, tributyl phosphate, triethyl phosphate (TEP), dibutyl phosphite, and triethyl phosphate.

In the formula $HO-(-CH_2-C(R^1)_2-(CH_2)_m-O-)_n-R^2$, each $R^1$ is preferably independently selected from H, $CH_3$, and $CH_2OH$. Examples of such solvents are glycols like diethylene glycol monobutyl ether, ethylene glycol, diethylene glycol, dipropylene glycol, and polyethylene glycols, glycerol, and pentaerythritol.

In addition, the accelerator solution may comprise additional organic compounds, such as aliphatic hydrocarbon solvents (e.g. white spirit, paraffins, or odourless mineral spirit (OMS)), aromatic hydrocarbon solvents (e.g. naphthenes or mixtures of naphthenes), aldehydes, ketones (e.g. 1,2-diketones like diacetyl or glyoxal), ethers, esters (e.g. dibutyl maleate, dibutyl succinate, ethyl acetate, butyl acetate, mono- and diesters of ketoglutaric acid, pyruvates, esters of ascorbic acid such as ascorbic palmitate, diethyl malonate, or succinates), alcohols (e.g. isobutanol, pentanol, benzyl alcohol, or fatty alcohols), phosphates, amides, carboxylic acids, 1,2-dioximes, N-methyl pyrrolidinone, N-ethyl pyrrolidinone, dimethyl formamide (DMF), dimethylsulfoxide (DMSO), and 2,2,4-trimethylpentanediol diisobutyrate (TXIB);

The accelerator solution and the pre-accelerated resin may optionally contain one or more promoters, bases, water, inhibitors, additives, and/or fillers.

Suitable promoters are carboxylate salts of ammonium, alkali metals, or alkaline earth metals. Examples of suitable metal carboxylate salts of ammonium, alkali metals, and alkaline earth metals are the 2-ethyl hexanoates (i.e. octoates), nonanoates, heptanoates, neodecanoates, and naphthenates. The preferred alkali metal is K. The salts may be added to the accelerator solution or the resin as such, or they may be formed in situ. For example, alkali metal 2-ethyl hexanoates can be prepared in situ in the accelerator solution, after addition of the alkali metal hydroxide and 2-ethyl hexanoic acid to the solution.

If one or more promoters is/are present in the accelerator solution, their amount preferably is at least 0.01 wt %, more preferably at least 0.1 wt %, even more preferably at least 1 wt %, more preferably at least 10 wt %, and most preferably at least 20 wt %; preferably not more than 90 wt %, more preferably not more than 80 wt %, and most preferably not more than 70 wt %, all based on the total weight of the accelerator solution.

Suitable nitrogen-containing bases to be present in the accelerator solution and the pre-accelerated resin are primary, secondary, and tertiary amines such as triethyl amine, dimethylaniline, diethylaniline, or N,N-dimethyl-p-toludine (DMPT), polyamines such as 1,2-(dimethyl amine)ethane, secondary amines such as diethyl amine, ethoxylated amines such as triethanol amine, dimethylamino ethanol, diethanol amine, or monoethanol amine, and aromatic amines such as pyridine or bipyridine. The nitrogen-containing base is preferably present in the accelerator solution in an amount of 5-50 wt %. In the pre-accelerator resin it is preferably present in an amount of 0.5-10 g/kg resin.

The accelerator solution may optionally comprise water. If present, the water content of the solution preferably is at least 0.01 wt % and more preferably at least 0.1 wt %. The water content is preferably not more than 50 wt %, more preferably not more than 40 wt %, more preferably not more than 20 wt %, even more preferably not more than 10 wt %, and most preferably not more than 5 wt %, all based on the total weight of the accelerator solution.

The accelerator solution can be prepared by simply mixing the ingredients, optionally with intermediate heating and/or mixing steps.

The pre-accelerated resin can be prepared in various ways: by mixing the individual ingredients with the resin, or by mixing the resin, including optional monomer, with the accelerator solution according to the present invention. The latter method is preferred.

Suitable resins to be cured according to the method of the present invention include alkyd resins, unsaturated polyester (UP) resins, vinyl ester resins, (meth)acrylate resins, polyurethanes, epoxy resins, and mixtures thereof. Preferred resins are (meth)acrylate resins, UP resins and vinyl ester resins.

In the context of the present application, the terms "unsaturated polyester resin" and "UP resin" refer to the combination of unsaturated polyester resin and ethylenically unsaturated monomeric compound. The term vinyl ester resin refers to a resin produced by the esterification of an epoxy resin with an unsaturated monocarboxylic acid, and dissolved in an ethylenically unsaturated monomeric compound (e.g. styrene). UP resins and vinyl ester resins as defined above are common practice and commercially available.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Acrylate and methacrylate resins without an additional ethylenically unsaturated monomeric compound like styrene are referred to in this application as (meth)acrylate resins.

Examples of ethylenically unsaturated monomeric compounds include styrene and styrene derivatives like α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), chlorostyrene, tert-butyl styrene, tert-butylacrylate, butanediol dimethacrylate and mixtures thereof. Suitable examples of (meth)acrylates reactive diluents are PEG200 di(meth)acrylate, 1,4-butanediol di(meth)acrylate, 1,3-butanediol di(meth)acrylate, 2,3-butanedioldi(meth)acrylate, 1,6-hexanediol di(meth)acrylate and its isomers, diethyleneglycol di(meth)acrylate, triethyleneglycol di(meth)acrylate, glycerol di(meth)acrylate, trimethylolpropane di(meth)acrylate, neopentyl glycol di(meth)acrylate, dipropyleneglycol di(meth)acrylate, tripropyleneglycol di(meth)acrylate, PPG250 di(meth)acrylate, tricyclodecane dimethylol di(meth)acrylate, 1,10-decanediol di(meth)acrylate, tetraethylene glycol di(meth)acrylate, trimethylolpropanetri(meth)acrylate, glycidyl (meth)acrylate, (bis)maleimides, (bis)citraconimides, (bis)itaconimides, and mixtures thereof.

The amount of ethylenically unsaturated monomer in the pre-accelerated resin is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

If an accelerator solution is used for curing a resin or for preparing a pre-accelerated resin, the accelerator solution is generally employed in amounts of at least 0.01 wt %, preferably at least 0.1 wt %, and preferably not more than 5 wt %, more preferably not more than 3 wt % of the accelerator solution, based on the weight of the resin.

Peroxides suitable for curing the resin and suitable for being present in the second component of the two-component composition include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. Preferred peroxides are organic hydroperoxides, ketone peroxides, peroxyesters, and peroxycarbonates. Even more preferred are hydroperoxides and ketone peroxides. Preferred hydroperoxides include cumyl hydroperoxide, 1,1,3,3-tetramethylbutyl hydroperoxide, tert-butyl hydroperoxide, isopropylcumyl hydroperoxide, tert-amyl hydroperoxide, 2,5-dimethylhexyl-2,5-dihydroperoxide, pinane hydroperoxide, para-menthane-hydroperoxide, terpene-hydroperoxide and pinene hydroperoxide. Preferred ketone peroxides include methyl ethyl ketone peroxide, methyl isopropyl ketone peroxide, methyl isobutyl ketone peroxide, cyclohexanone peroxide, and acetylacetone peroxide.

Of course, also mixtures of two or more peroxides can be used; for instance a combination of a hydroperoxide or ketone peroxide with a peroxyester.

A particularly preferred peroxide is methyl ethyl ketone peroxide. The skilled person will understand that these peroxides can be combined with conventional additives, for instance fillers, piments, and phlegmatisers. Examples phlegmatizers are hydrophilic esters and hydrocarbon solvents. The amount of peroxide to be used for curing the resin is preferably at least 0.1 per hundred resin (phr), more preferably at least 0.5 phr, and most preferably at least 1 phr. The amount of peroxide is preferably not more than 8 phr, more preferably not more than 5 phr, most preferably not more than 2 phr.

Curing is generally started by either adding the accelerator solution according to the invention and the initiator (peroxide) to the resin, or by adding the peroxide to the pre-accelerated resin. In other words, the peroxide can be added to the pre-accelerated resin, to a pre-mix of resin and accelerator solution, or to the resin prior to addition of the accelerator solution.

The resulting mixture is mixed and dispersed. The curing process can be carried out at any temperature from −15° C. up to 250° C., depending on the initiator system, the accelerator system, the compounds to adapt the curing rate, and the resin composition to be cured. Preferably, it is carried out at ambient temperatures commonly used in applications such as hand lay-up, spray-up, filament winding, resin transfer moulding, coating (e.g. gelcoat and standard coatings), button production, centrifugal casting, corrugated sheets or flat panels, relining systems, kitchen sinks via pouring compounds, etc. However, it can also be used in SMC, BMC, pultrusion techniques, and the like, for which temperatures up to 180° C., more preferably up to 150° C., most preferably up to 100° C., are used.

Other optional additives may be employed in the curing process, such as fillers, fibres, pigments, inhibitors, co-agents, and promoters.

Examples of fibers are glass fibers, carbon fibers, aramid fibres (e.g. Twaron®), natural fibers (e.g. jute, kenaf, industrial hemp, flax (linen), ramie, etc.).

Examples of fillers are quartz, sand, aluminium trihydroxide, magnesium hydroxide, chalk, calcium hydroxide, clays, and lime.

The cured resin can be subjected to a post-cure treatment to further optimize the hardness. Such post-cure treatment is generally performed at a temperature in the range 40-180° C. for 30 min to 15 hours.

The cured resins find use in various applications, including marine applications, chemical anchoring, roofing, construction, relining, pipes and tanks, flooring, windmill blades, laminates, etc.

The invention claimed is:

1. A method for curing a radically curable resin, the method comprising adding to said resin an organic peroxide and a metal-bearing polymer, said metal-bearing polymer comprising functional groups that coordinate to a Cu, Mn, Fe, or V metal and form a complex together with said metal and a complexing agent, wherein the radically curable resin is an unsaturated polyester resin or a vinyl ester resin.

2. The method according to claim 1 wherein the metal is Cu, Fe, or V.

3. A two-component composition comprising a first component and a second component, the first component comprising a radically curable resin and a metal-bearing polymer comprising functional groups that coordinate to a Cu, Mn, Fe, or V metal and form a complex together with said metal and a complexing agent, the second component comprising an organic peroxide, wherein the radically curable resin is an unsaturated polyester resin or a vinyl ester resin.

4. The two component composition according to claim 3 wherein the peroxide is an organic hydroperoxides, a ketone peroxide, a peroxycarbonate, or a peroxyester.

5. The two component composition according to claim 3 wherein the metal is selected Cu, Fe, and or V.

6. The method according to claim 1 wherein the metal-bearing polymer is added to the resin in the form of an accelerator solution suitable for forming a redox couple with a peroxide, the accelerator solution comprising:
- at least one solvent selected from compounds with the formulae $P(R)_3$, $P(R)_3=O$, and $HO-(-CH_2-C(R^1)_2-(CH_2)_m-O-)_n-R^2$, wherein each R is independently selected from hydrogen, alkyl with 1 to 10 carbon atoms, and alkoxy groups with 1 to 10 carbon atoms, each $R^1$ is independently selected from the group consisting of hydrogen, alkyl groups with 1-10 carbon atoms, and hydroxyalkyl groups with 1 to 10 carbon atoms, n=1-10, m=0 or 1, and $R^2$ is hydrogen or an alkyl group with 1-10 carbon atoms, and
- a metal-bearing polymer, said metal-bearing polymer comprising functional groups that coordinate to a metal selected from the group consisting of Cu, Mn, Fe, and V and form a complex together with said metal and a complexing agent.

7. The method according to claim 1 comprising providing a two-component composition comprising a first component and a second component, the first component comprising a radically curable resin and a metal-bearing polymer comprising functional groups that coordinate to a Cu, Mn, Fe, or V metal and form a complex together with said metal and a complexing agent, the second component comprising an organic peroxide, and mixing the first component with the second component, wherein the radically curable resin is an unsaturated polyester resin or a vinyl ester resin.

8. The two component composition according to claim 4 wherein the metal is Cu, Fe, or V.

9. The method according to claim 6 wherein the metal content of said metal-bearing polymer is in the range 0.01-15 wt %.

10. The method according to claim 6, wherein the metal is selected Cu, Fe, or V.

11. The method according to claim 7 wherein the organic peroxide is an organic hydroperoxide, a ketone peroxide, a peroxycarbonate, or a peroxyester.

\* \* \* \* \*